United States Patent
Rattunde

(10) Patent No.: US 10,239,189 B2
(45) Date of Patent: Mar. 26, 2019

(54) CLAMPING SYSTEM FOR SEVEN-FOLD CUTTING

(71) Applicant: Rattunde & CO GMBH, Ludwigslust (DE)

(72) Inventor: Ulrich Rattunde, Bentswisch (DE)

(73) Assignee: Rattunde AG, Ludwigslust (DE)

( * ) Notice: Subject to any disclaimer, the term of this patent is extended or adjusted under 35 U.S.C. 154(b) by 0 days.

(21) Appl. No.: 14/783,220

(22) PCT Filed: Mar. 25, 2014

(86) PCT No.: PCT/EP2014/056005
§ 371 (c)(1),
(2) Date: Oct. 8, 2015

(87) PCT Pub. No.: WO2014/166737
PCT Pub. Date: Oct. 16, 2014

(65) Prior Publication Data
US 2016/0046000 A1    Feb. 18, 2016

(30) Foreign Application Priority Data

Apr. 8, 2013 (DE) .......................... 10 2013 103 486

(51) Int. Cl.
*B25B 1/24* (2006.01)
*B23D 47/04* (2006.01)
(Continued)

(52) U.S. Cl.
CPC ............ *B25B 1/2426* (2013.01); *B23D 47/04* (2013.01); *B23D 47/06* (2013.01); *B25B 1/241* (2013.01); *B25B 1/2405* (2013.01); *B26D 3/161* (2013.01)

(58) Field of Classification Search
CPC .... B25B 1/00; B25B 3/00; B25B 5/00; B25B 7/00; B25B 1/2426; B25B 1/2405;
(Continued)

(56) References Cited

U.S. PATENT DOCUMENTS 4,121,815 A * 10/1978 Paterson ................. B25B 5/102
 269/203
4,475,607 A    10/1984 Haney
(Continued)

FOREIGN PATENT DOCUMENTS

CN    201432147 Y    3/2010
DE    102009058036 B3    4/2011
(Continued)

*Primary Examiner* — David Bryant
*Assistant Examiner* — Nirvana Deonauth
(74) *Attorney, Agent, or Firm* — Bay State IP, LLC

(57) ABSTRACT

The invention relates to a clamp for seven longitudinal profiles (1, 2, 3, 4, 5, 6, 7) arranged next to one another and oriented in a longitudinal direction (L), said clamp having one clamping jaw (11) and another clamping jaw (12) which are movable towards one another and away from one another, with a receiving area (13) in the one clamping jaw (11), which receiving area has a bearing face (13c) at the bottom for two of the seven longitudinal profiles (2, 3), said bearing face being movable at least in some regions relative to the clamping jaw (11) transversely to the longitudinal direction (L), and with another receiving area (14) provided in the other clamping jaw (12) for the bearing of four others of the seven longitudinal profiles (1, 4, 5, 6).

10 Claims, 11 Drawing Sheets

Figure 1B:
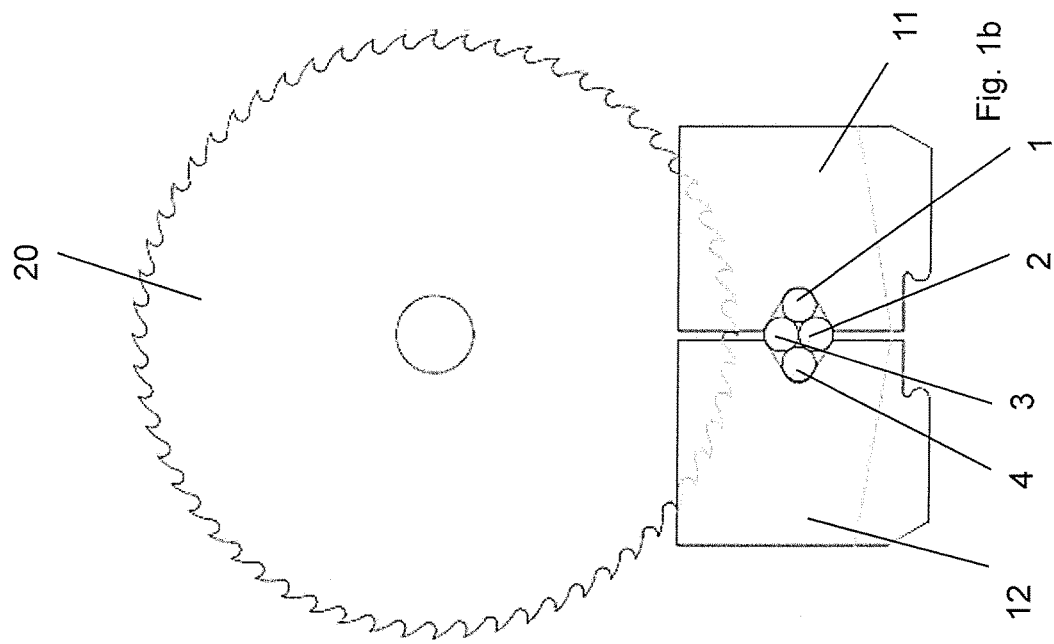

(51) Int. Cl.
*B23D 47/06* (2006.01)
*B26D 3/16* (2006.01)

(58) Field of Classification Search
CPC ........ B25B 1/241; B26D 3/161; B23D 47/06; B23D 47/04
USPC ........ 269/43, 45, 71, 55, 900; 30/90.4–90.8, 30/91.2, 96; 83/206, 323, 374–377, 83/451–456, 465, 466, 466.1
See application file for complete search history.

(56) References Cited

U.S. PATENT DOCUMENTS

| | | | | |
|---|---|---|---|---|
| 6,128,976 | A * | 10/2000 | Tarpill | H02G 1/1224 30/90.1 |
| 6,658,739 | B1 * | 12/2003 | Huang | B23D 21/08 30/101 |
| 7,257,895 | B2 * | 8/2007 | Makkonen | B23D 45/124 269/242 |
| 8,474,806 | B2 * | 7/2013 | Orgeron | B25B 5/061 269/218 |
| 8,584,335 | B2 * | 11/2013 | Tsang | B25B 5/12 269/266 |
| 2006/0260132 | A1 * | 11/2006 | Schmode | H02G 1/1231 30/90.7 |

FOREIGN PATENT DOCUMENTS

| | | |
|---|---|---|
| DE | 1993496 U | 11/2014 |
| EP | 0318300 A2 | 5/1989 |
| EP | 0513524 A2 | 11/1992 |

* cited by examiner

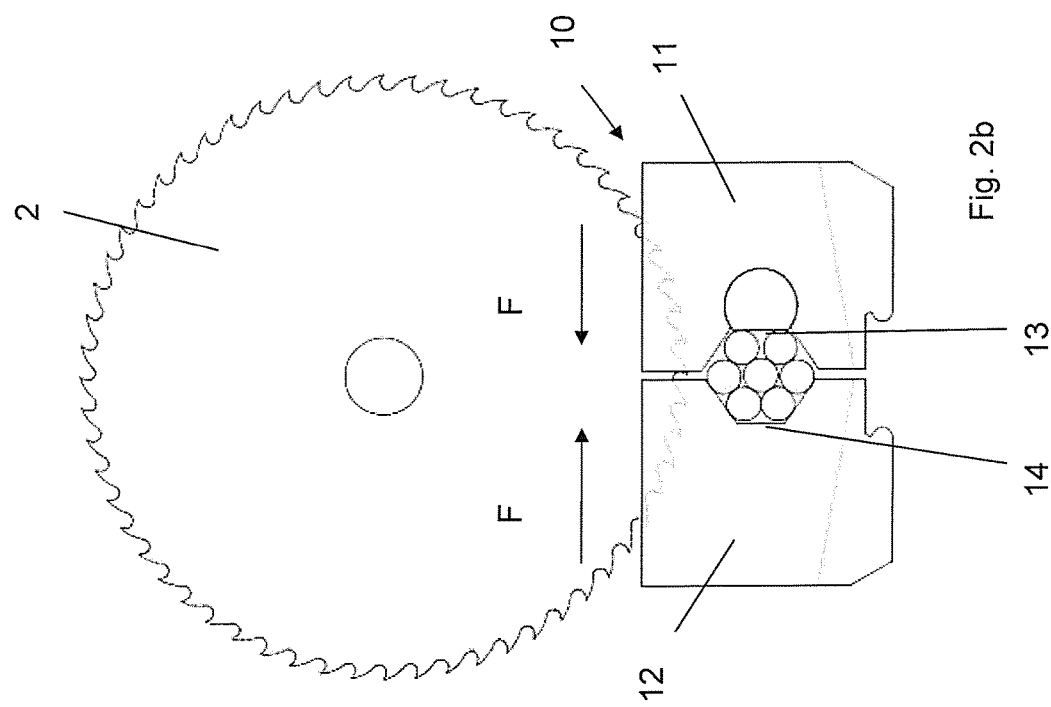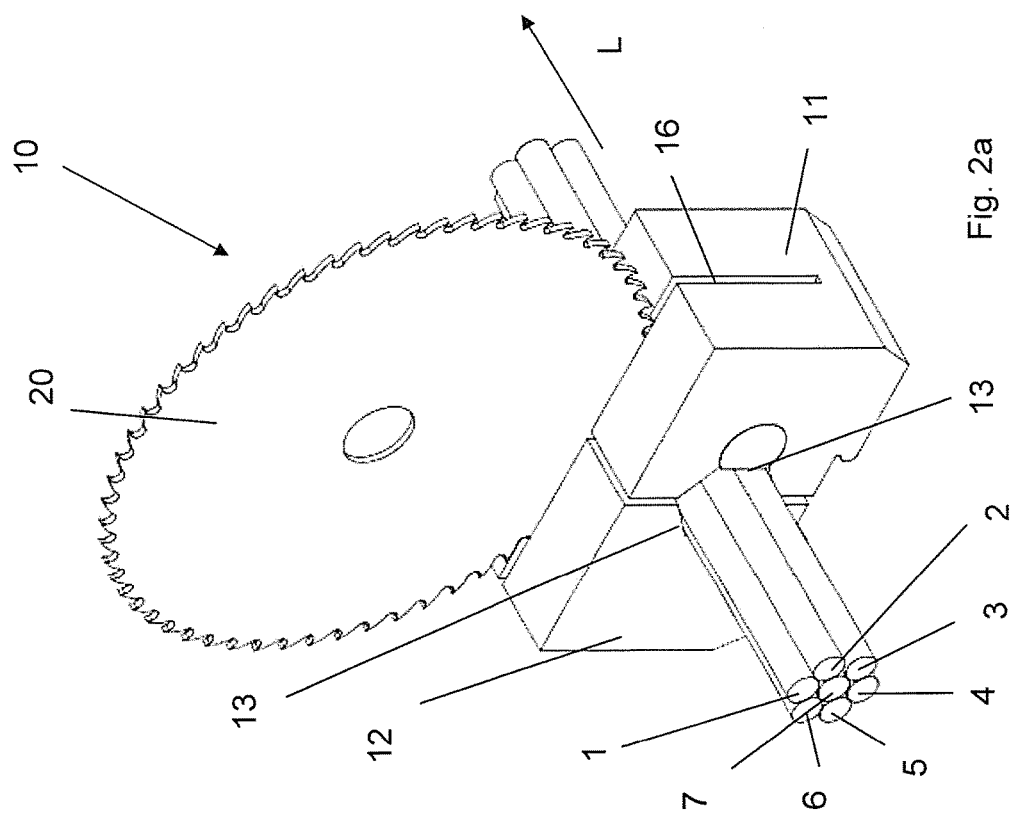

CLAMPING SYSTEM FOR SEVEN-FOLD CUTTING

CROSS REFERENCE TO RELATED APPLICATION

This application is for entry into the U.S. National Phase under § 371 for International Application No. PCT/EP2014/056005 having an international filing date of Mar. 25, 2014, and from which priority is claimed under all applicable sections of Title 35 of the United States Code including, but not limited to, Sections 120, 363, and 365(c), and which in turn claims priority under 35 USC 119 to German Application No. 102013103486.1 filed on Apr. 8, 2013.

The invention relates to a clamp for seven longitudinal profiles arranged next to one another and oriented in a longitudinal direction.

In order to cut longitudinal profiles to length, particularly metal longitudinal profiles or metal pipes, the longitudinal profiles must be clamped during the cutting operation in order to permit a highly precise cut. It is known to clamp four pipes simultaneously by means of a clamping system for a four-fold cut. Modern pipe processing machines make it possible to cut around 11,000 pipes per hour in a four-fold cut.

One problem is that the known clamps with symmetrical receiving areas cannot readily be expanded for seven-fold cutting since, with a simple hexagonal clamp, that is to say a receiving area that is an exact hexagon in cross section, the diameter fluctuations of 0.1 to 0.2 mm which always exist as well as deviations from the precise circular shape of the pipes would inevitably lead to the situation whereby one or more of the seven pipes are not securely clamped but rather rotate during the cutting operation.

The object of the present invention is therefore to provide a clamp of the type mentioned in the introduction which permits the rotation-free clamping of seven longitudinal profiles arranged next to one another in a longitudinal direction, in order to cut said longitudinal profiles to length.

The object is achieved by a clamp of the type mentioned in the introduction having one clamping jaw and another clamping jaw which are movable towards one another and away from one another, with a receiving area in the one clamping jaw, which receiving area has a bearing face at the bottom for two of the seven longitudinal profiles, said bearing face being movable at least in some regions relative to the clamping jaw transversely to the longitudinal direction, and with another receiving area provided in the other clamping jaw for the bearing of four others of the seven longitudinal profiles.

The movable bearing face can be configured in various ways. It may be movable over its entire expanse relative to the one clamping jaw, or else one, two or more regions or sections of the bearing face may be movable relative to the one clamping jaw. It may have at least one elastic element which is flexible transversely, preferably perpendicularly, to the longitudinal direction. In another embodiment, the bearing face is tiltable or rotatable transversely to the longitudinal direction. According to the invention, the bearing face is configured in such a way that it compensates fluctuations in the external diameter of the longitudinal profile sections, which are preferably circular in cross section, in that the distance of regions of the movable bottom bearing face of the one receiving area from preferably directly opposite bottom regions of the bearing face of the other receiving area is variable.

The bearing face which is arranged on the one clamping jaw and which is movable at least in some regions transversely to the longitudinal direction is provided for two of the seven longitudinal profiles, and the other receiving area provided on the other clamping jaw is provided for the bearing of four others of the seven longitudinal profiles. The seven longitudinal profiles are oriented in a longitudinal direction and are arranged in a bundle next to one another in a cross section perpendicular to the longitudinal direction. Some longitudinal profiles make contact with one another, others do not make contact with one another.

A longitudinal profile is understood to mean, in particular, metal longitudinal profiles and especially metal pipes.

According to the invention, the receiving area for the seven longitudinal profiles does not have an exact and rigid prismatic hexagonal shape; this enables the rotation-free clamping of seven longitudinal profiles simultaneously.

The longitudinal profiles are preferably all circular in a cross section perpendicular to the longitudinal direction. Longitudinal profiles which are circular in cross section are particularly common. Here, circular is also understood to mean small deviations in the region of around 0.2 mm.

The other clamping jaw advantageously has another receiving area for the bearing of four of the seven longitudinal profiles, which during the clamping operation also make contact with other lateral bearing faces of the other receiving area.

Preferably, the one receiving area and advantageously also the other receiving area are substantially prismatic in shape. Rotation-free clamping is improved as a result.

In one particularly preferred further development of the invention, a compensating piece which is mounted such as to be able to rotate about an axis of rotation oriented in the longitudinal direction is provided, said compensating piece having the tiltable bearing face. The tiltable bearing face forms, as it were, a bottom bearing face of the one receiving area, said receiving area preferably being substantially prismatic.

Advantageously, the other receiving area has two other lateral bearings running towards one another at an angle of more than 60° counter to a clamping direction of the other clamping jaw. As a result, four longitudinal profiles always bear against the other lateral bearing face, even in the event of small diameter fluctuations of the seven pipes.

Preferably, seven longitudinal profiles are arranged in the clamp and one central longitudinal profile is surrounded by six longitudinal profiles in an annular fashion, and two longitudinal profiles which bear against the tiltable bearing face do not make contact with one another even in a clamped state of the clamp. As a result, no closed force profile forms in cross section in the transverse direction, which is arranged perpendicular to the longitudinal direction.

Preferably, the central longitudinal profile, in the clamped state, makes contact with the two longitudinal profiles which bear against the tiltable bottom bearing face, and makes contact with the two longitudinal profiles adjacent to the other bottom bearing face and does not make contact with the two longitudinal profiles running along an air gap between the clamped clamping jaws.

With particular advantage, one receiving area includes the compensating piece and the one receiving area has lateral bearing faces which in the clamped state are not in contact with any of the longitudinal profiles.

The relative arrangements, according to the invention, of the longitudinal profiles make it possible for the latter to be clamped in a rotation-free manner.

Figure 1A:
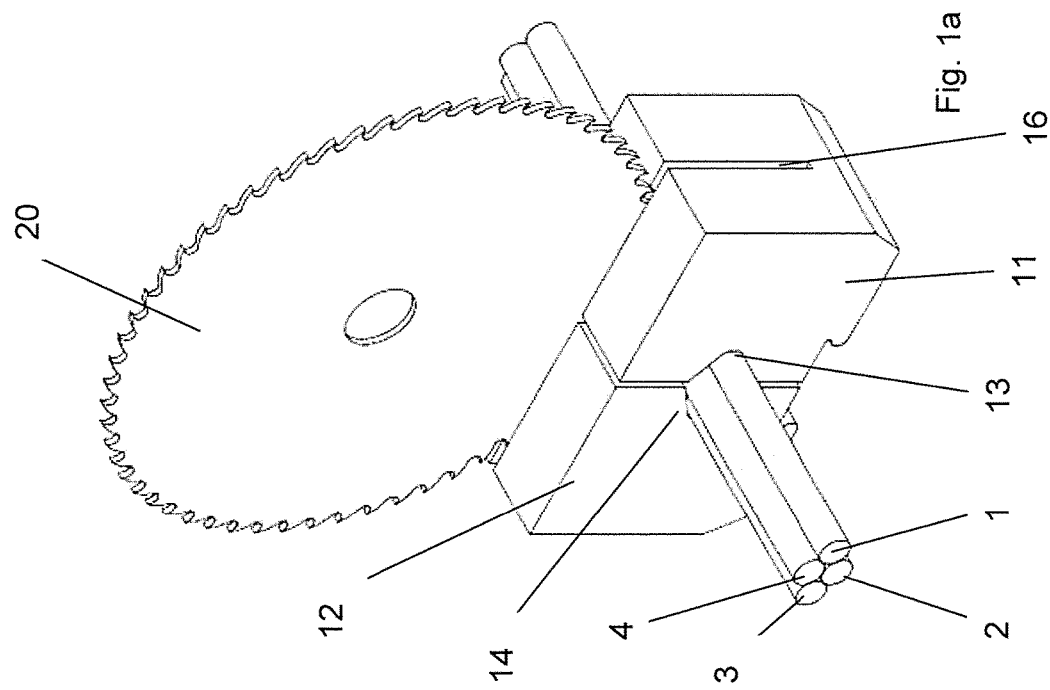
Figure 3:
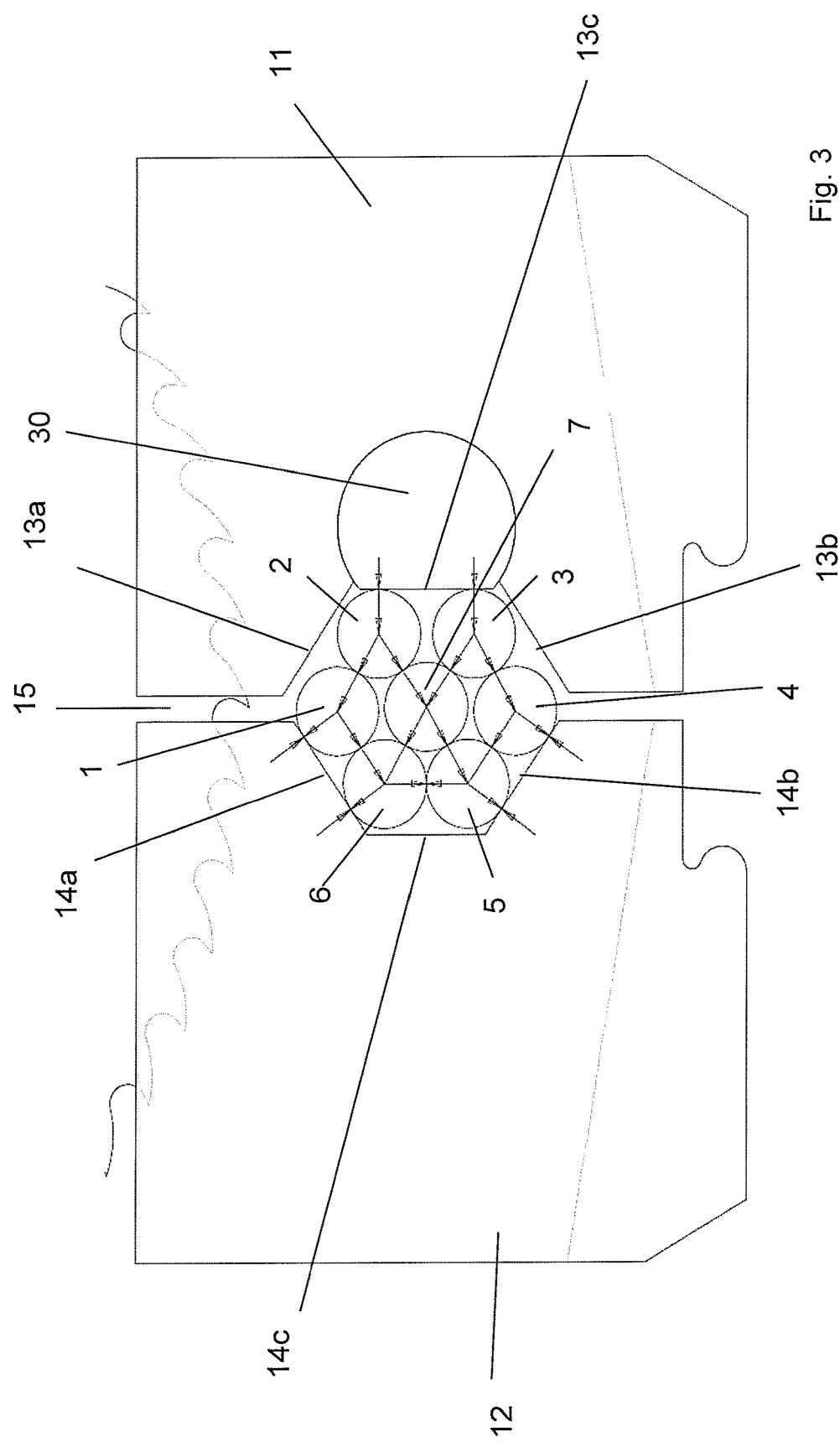
Figure 4:
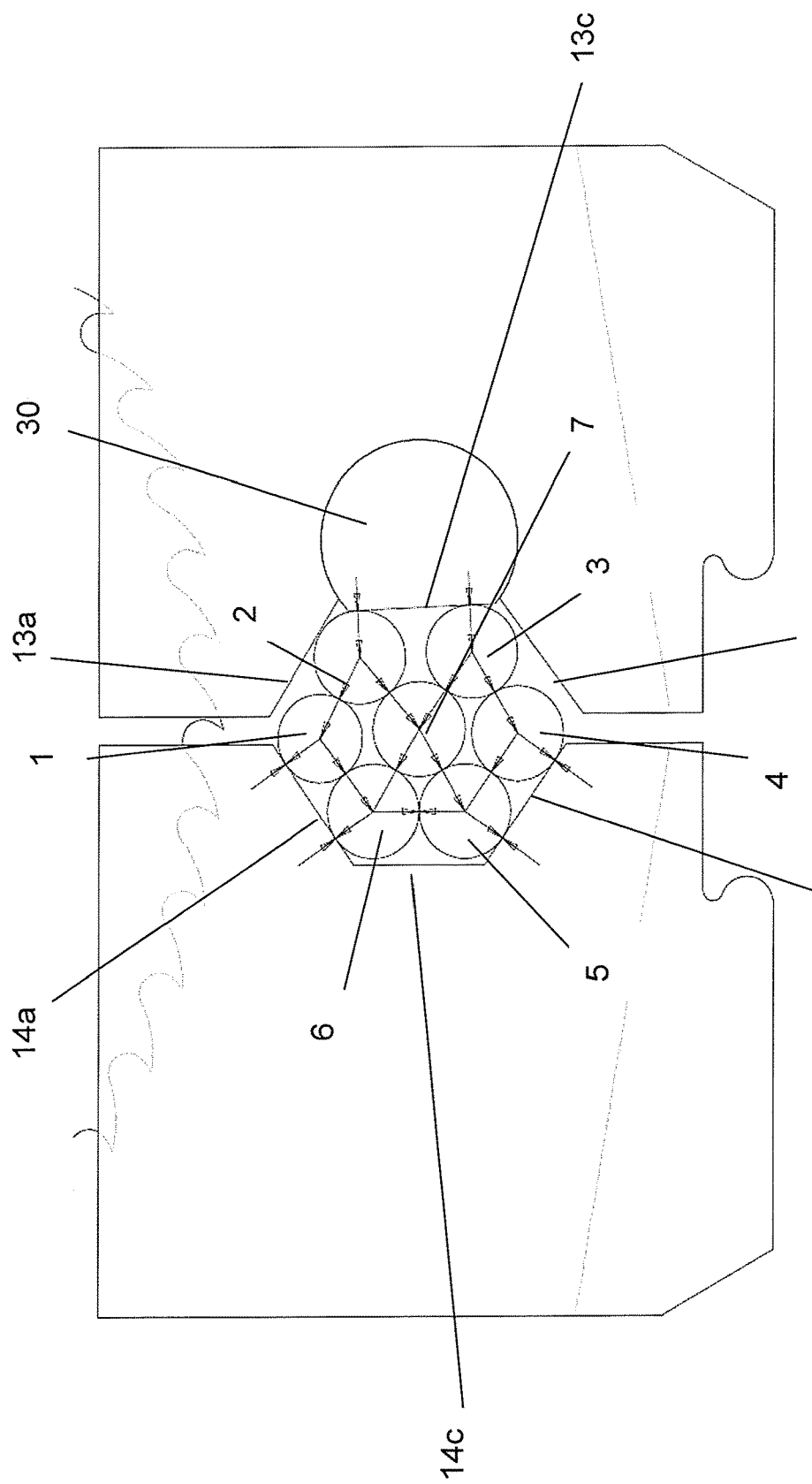
Figure 5:
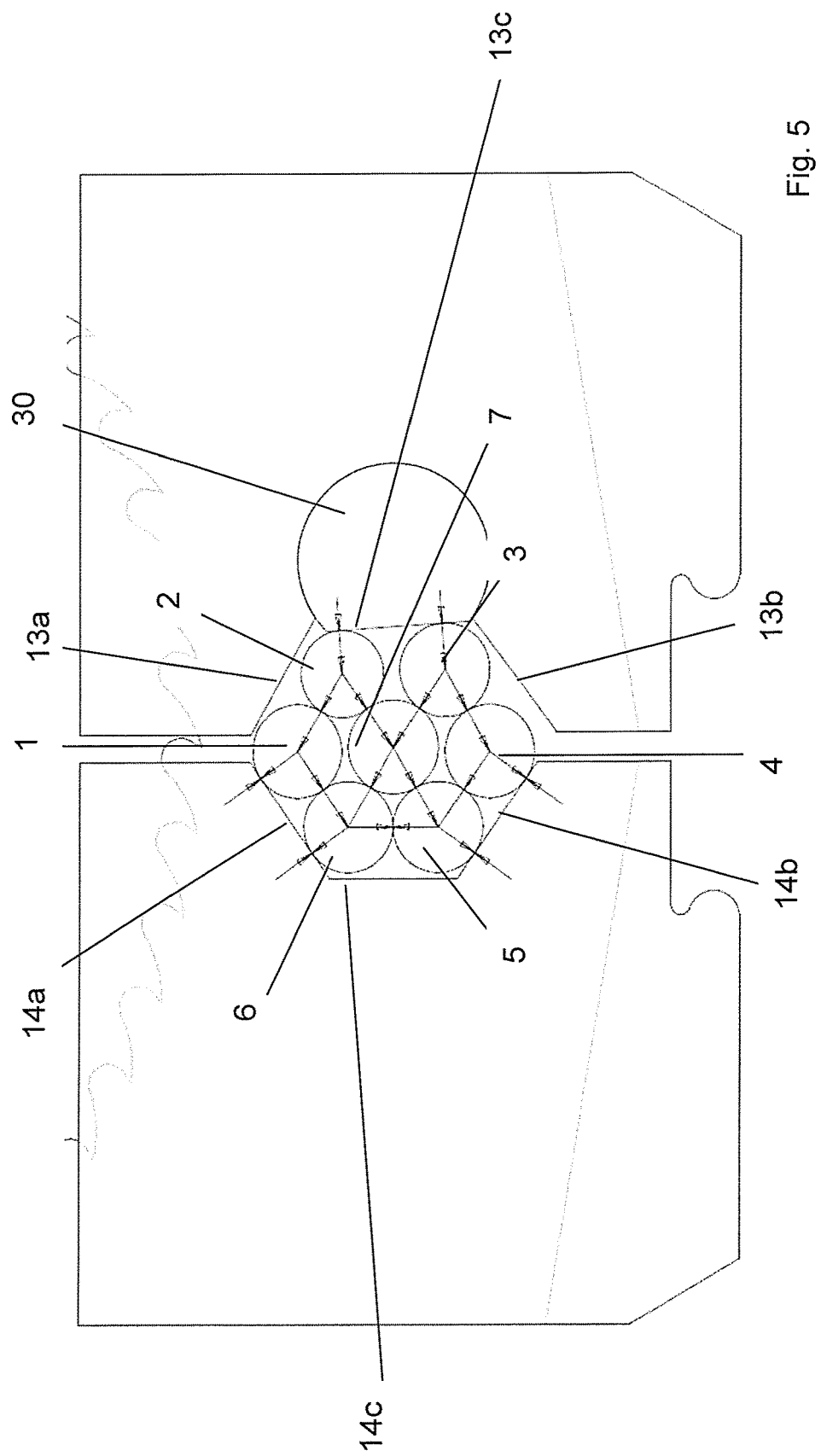
Figure 6:
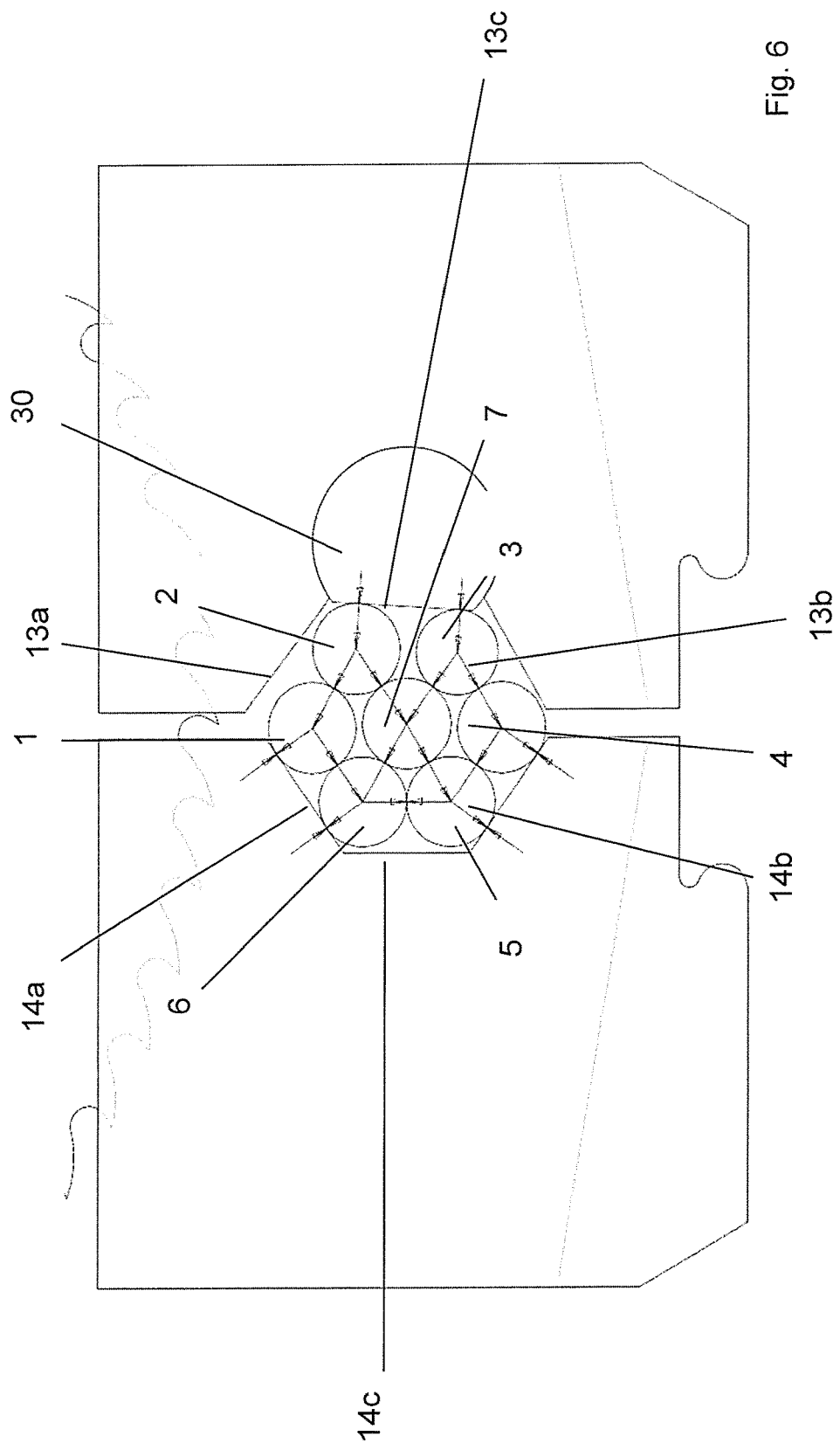
Figure 7:
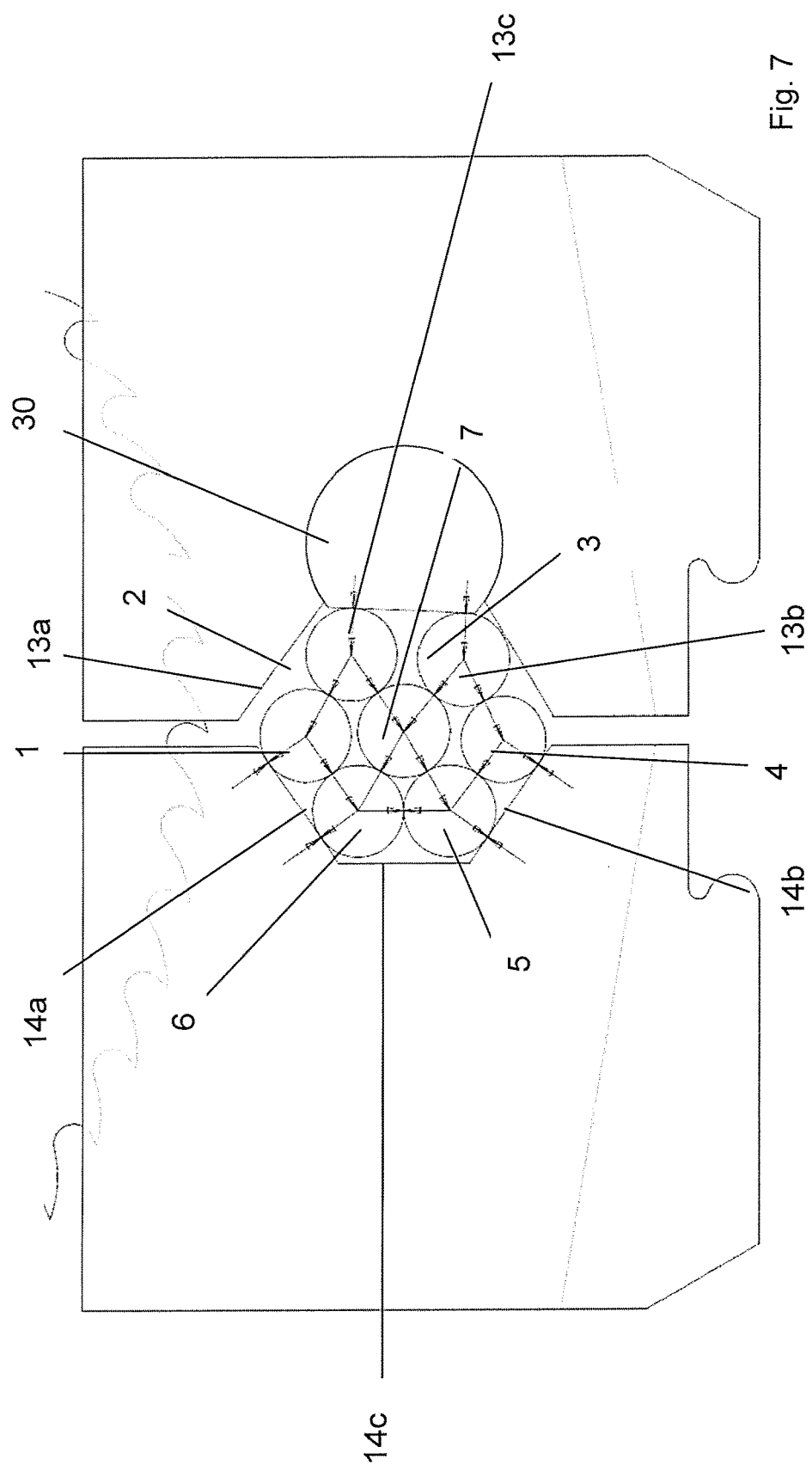
Figure 8:
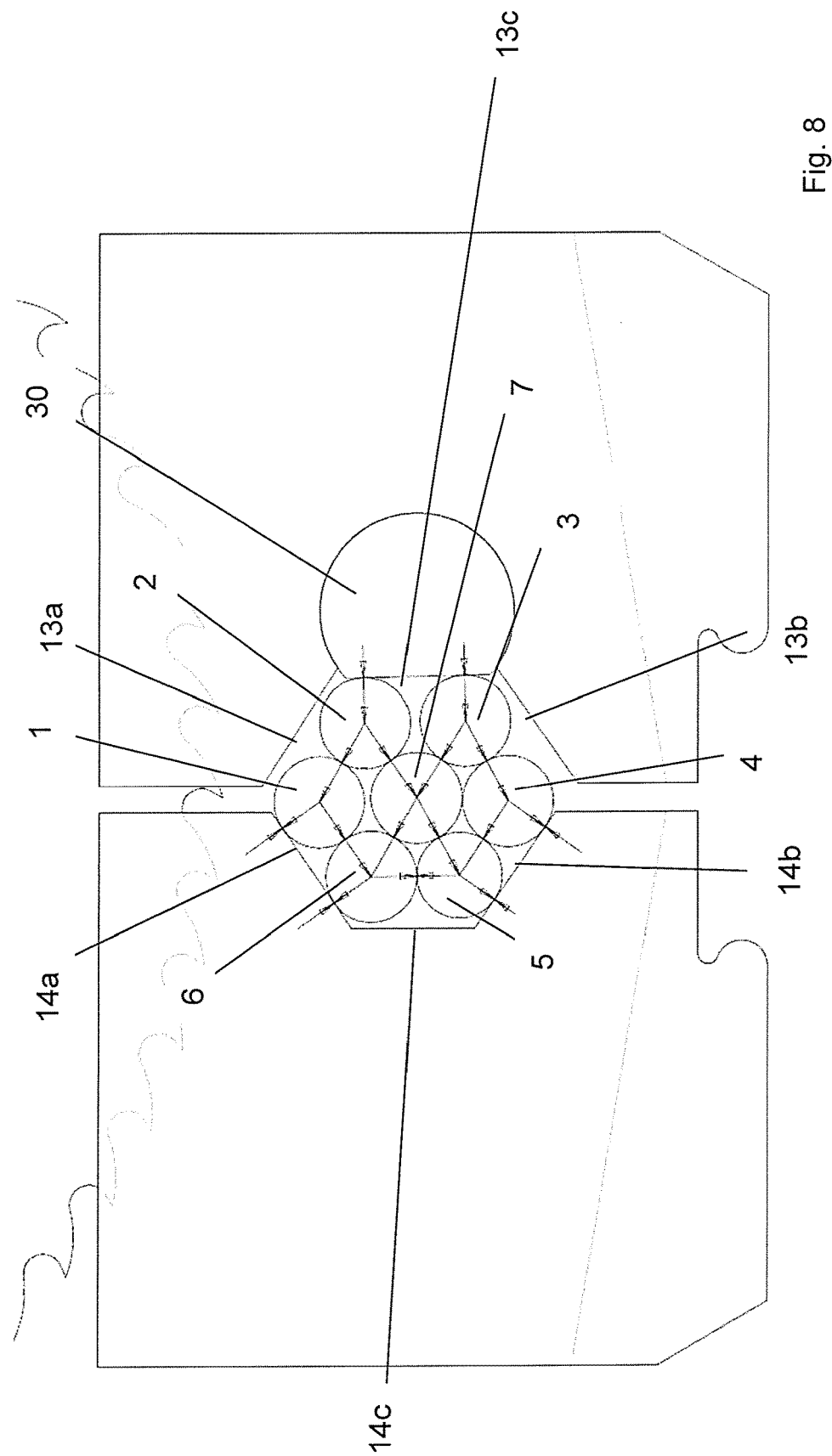
Figure 9:
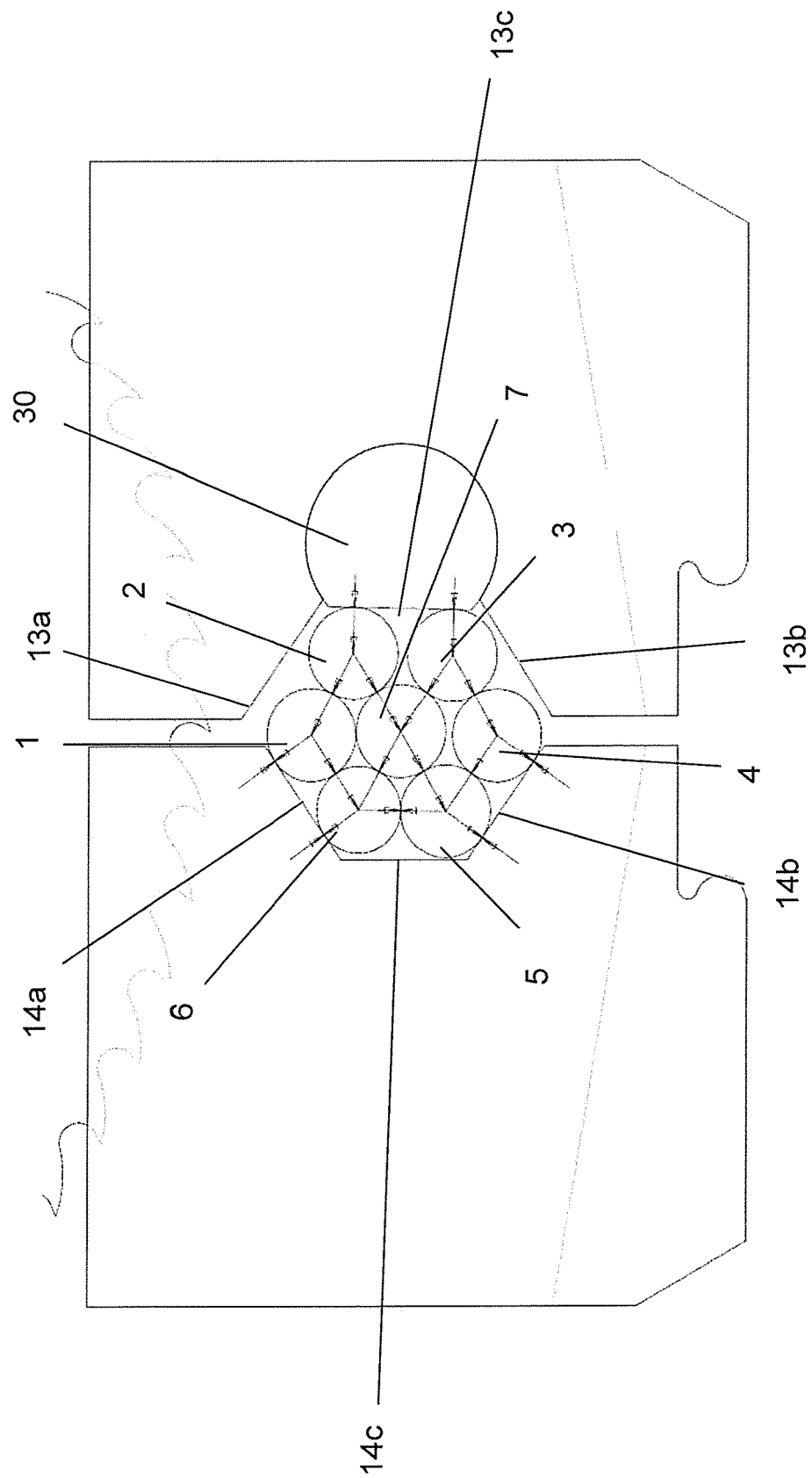
Figure 10:
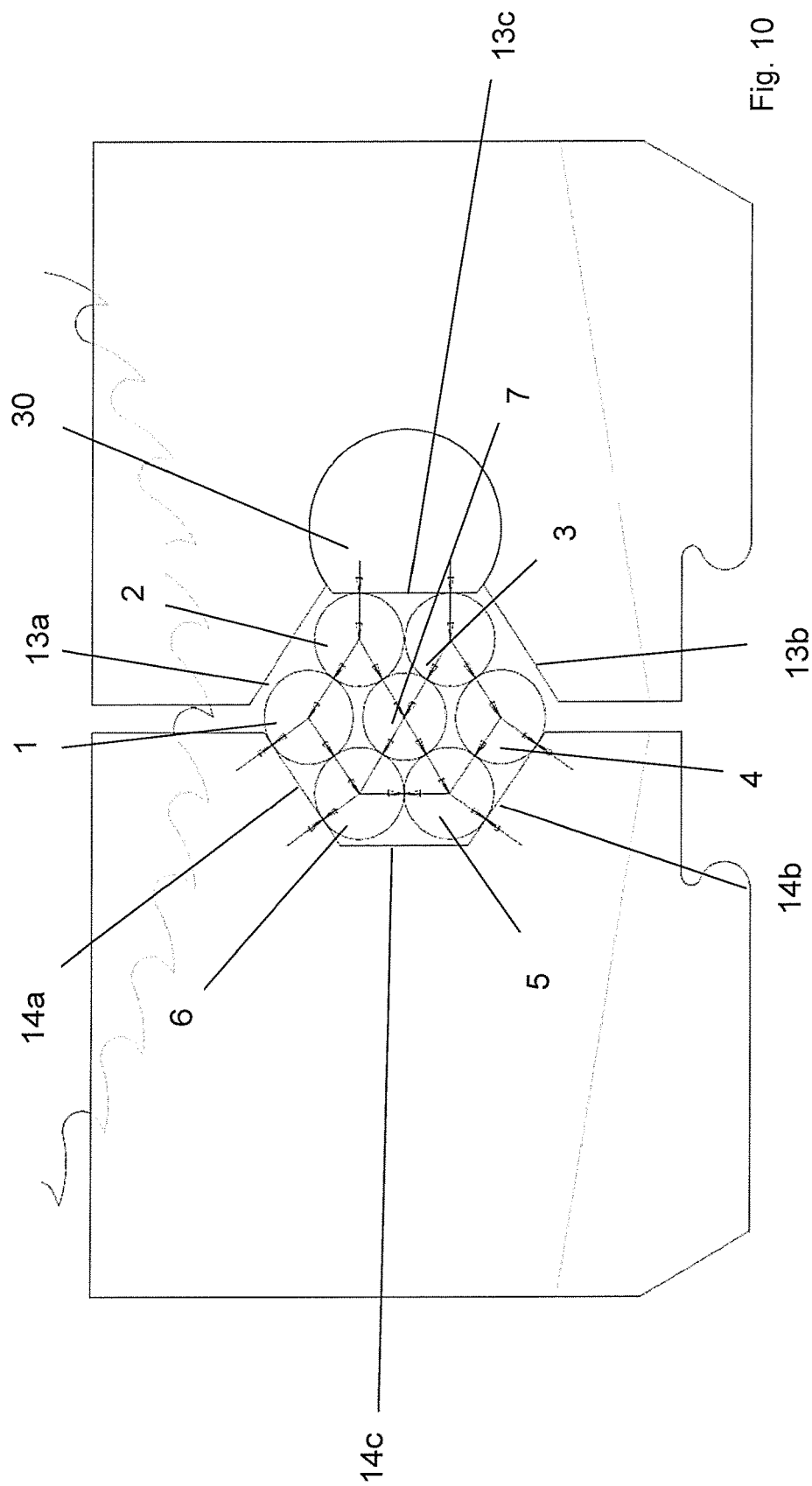
Figure 11:
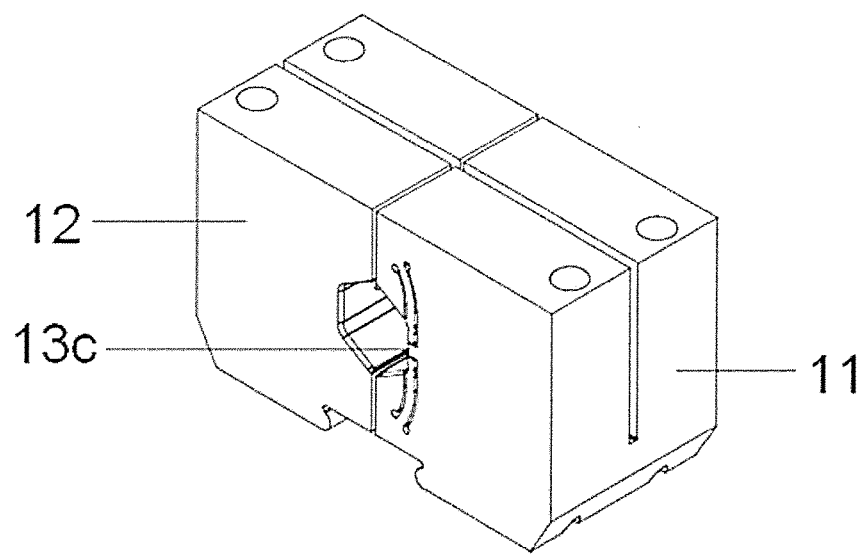
Figure 12:
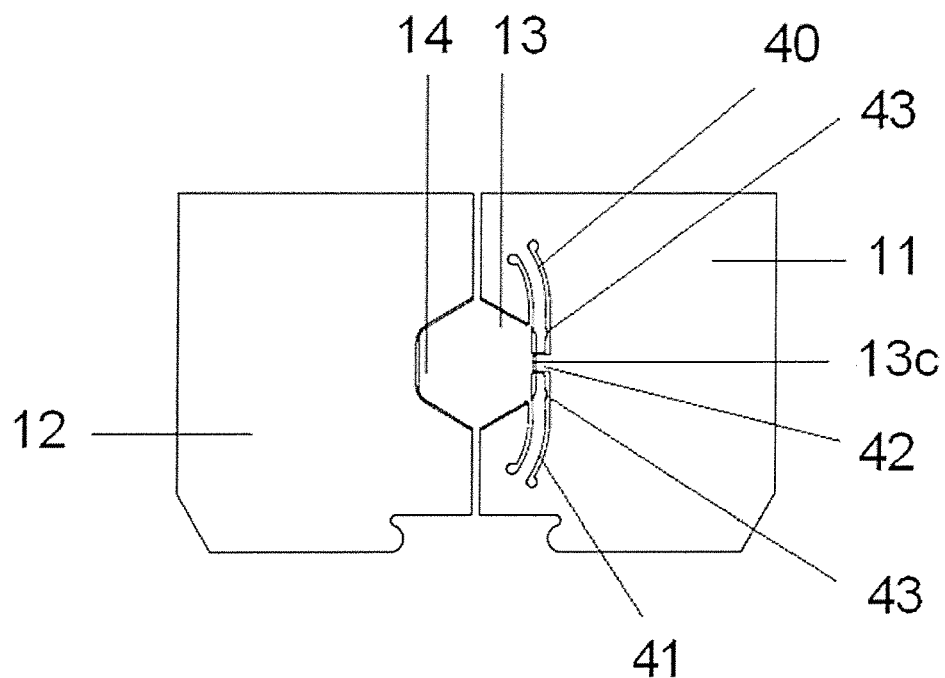

The invention will be described with reference to two examples of embodiments in fourteen figures, in which:

FIG. 1a shows a perspective view of a clamp for four pipes according to the prior art, with a saw blade, FIG. 1b shows a side view of the clamp in FIG. 1a, FIG. 2a shows a perspective view of a first embodiment of a clamp according to the invention for seven pipes, with a saw blade, FIG. 2b shows a side view of the clamp in FIG. 2a, FIG. 3 shows a side view of a detail in FIG. 2b with seven pipes and with an illustrated clamping force profile when the pipes 1 to 7 have the same diameter, FIG. 4 shows a view according to FIG. 3 when pipe 1 has a smaller diameter than pipes 2 to 7, FIG. 5 shows a view according to FIG. 3 when pipe 2 has a smaller diameter than pipe 1 and pipes 3 to 7, FIG. 6 shows a view according to FIG. 3 when pipe 3 has a smaller diameter than pipe 1, pipe 2, pipes 4 to 7, FIG. 7 shows a view according to FIG. 3 when pipe 4 has a smaller diameter than pipes 1 to 3 and pipes 5 to 7, FIG. 8 shows a view according to FIG. 3 when pipe 5 has a smaller diameter than pipes 1 to 4 and pipes 6 to 7, FIG. 9 shows a view according to FIG. 3 when pipe 6 has a smaller diameter than pipes 1 to 5 and pipe 7, FIG. 10 shows a side view according to FIG. 3 when pipe 7 has a smaller diameter than pipes 1 to 6, FIG. 11 shows a perspective view of a second embodiment of the clamp according to the invention, FIG. 12 shows a side view of the clamp in FIG. 11.

The production output of pipe cutting machines can be considerably increased when a plurality of pipes 1, 2, 3, 4, 5, 6, 7 can be cut to length simultaneously in one cutting operation.

FIGS. 1a and 1b show a known clamp 10 by which four pipes 1, 2, 3, 4, located next to one another and oriented in a longitudinal direction L, can be simultaneously clamped in a rotation-free manner. The clamp has two clamping jaws 11, 12, each having an approximately funnel-shaped receiving area 13, 14. The two clamping jaws 11, 12 are able to move towards one another and away from one another. The pipes 1, 2, 3, 4 are cut by means of a saw blade 20 which is introduced into a slot 16 in the two clamping jaws 11, 12, said slot being formed perpendicular to the longitudinal direction L of the pipes 1, 2, 3, 4.

On the one hand, four pipes 1, 2, 3, 4 usually do not have a precisely identical diameter; on the other hand, the pipes 1, 2, 3, 4 are in each case also not precisely circular. These two deviations are of no significance for rotation-free clamping of four pipes 1, 2, 3, 4 by a clamp 10 in FIGS. 1a and 1b. Even in the event of diameter differences or deviations from the precise circular cross-sectional shape perpendicular to the longitudinal direction L, the four pipes 1, 2, 3, 4 can always be simultaneously clamped in a rotation-free manner by means of two funnel-shaped, mirror-symmetrical receiving areas 13, 14.

Expansion to a clamp 10 for seven pipes 1, 2, 3, 4, 5, 6, 7 as shown in FIG. 2a and FIG. 2b is problematic. A clamp 10 having two receiving areas 13, 14 formed symmetrically in relation to one another for seven pipes 1, 2, 3, 4, 5, 6, 7 usually leads to the situation whereby one of the pipes 1, 2, 3, 4, 5, 6, 7, often the central pipe 7, is not clamped in a rotation-free manner.

FIGS. 2a and 2b show a clamp 10 according to the invention in a first embodiment for seven pipes 1, 2, 3, 4, 5, 6, 7, said clamp having two clamping jaws 11, 12 which are each able to move back and forth in a clamping direction S that is perpendicular to the longitudinal direction L, wherein the one clamping jaw 11 has one receiving area 13 and the other clamping jaw 12 has another receiving area 14 and the two receiving areas 13, 14 are dimensioned not exactly as a mirror image in relation to one another. The one clamping jaw 11 has a compensating piece 30 which is mounted such as to be able to rotate about an axis of rotation D arranged in the longitudinal direction L.

FIG. 3 shows an enlarged side view of the clamp 10 according to the invention in FIG. 2b having the one clamping jaw 11 and the other clamping jaw 12. Even in the clamped state of FIG. 3, an air gap 15 is formed between the two clamping jaws 11, 12. The two clamping jaws 11, 12 do not make contact with one another but rather are completely separated from one another by the air gap 15.

In FIG. 3, the seven pipes 1, 2, 3, 4, 5, 6, 7 have a precisely identical diameter in cross section. The first pipe 1 and fourth pipe 4 are arranged directly at the air gap 15, the second pipe 2 and third pipe 3 make contact with a movable bottom bearing face 13c, and the fifth pipe 5 and sixth pipe 6 are arranged adjacent to a bottom bearing face 14c.

Here, the pipes 1, 2, 3, 4, 5, 6, 7 are all precisely circular. According to the invention, no circularly closed clamping force profile forms along the six pipes 1, 2, 3, 4, 5, 6 surrounding the central pipe 7 in an annular fashion. In FIG. 3, the second pipe 2 and the third pipe 3 do not make contact with one another. In FIG. 3, and also in the subsequent figures, the first pipe 1 and the seventh pipe 7 and also the fourth pipe 4 and the seventh pipe 7 do not make contact with one another, so that no force transmission can take place between them.

The other receiving area 14 is prismatic in cross section perpendicular to the longitudinal direction L, wherein two lateral bearing faces 14a, 14b, which run towards one another at an angle of more than 60° counter to the clamping force direction Q, and another bottom bearing face 14c arranged between the two other lateral bearing faces 14a, 14b are provided.

The one receiving area 13 has, between its two lateral bearing faces 13a, 13b, a bottom bearing face 13c which is able to move relative to the one clamping jaw 11. The one receiving area 13 is likewise substantially prismatic, wherein, at an identical distance as seen from the air gap 15, the distance between the lateral bearing faces 13a, 13b is greater than the distance between the two other lateral bearing faces 14a, 14b.

The movable bottom bearing face 13c runs along the axis of rotation D of the compensating piece 30. In cross section perpendicular to the axis of rotation D, the movable bottom bearing face 13c corresponds to a cutting line of a segment piece that is cut off from the circular compensating piece 30.

A height of the other lateral bearing faces 14a, 14b along the clamping direction S is such that a clamping force F exerted by the compensating piece 30 on the second and third pipe 2, 3 is conducted respectively via the first pipe 1 and fourth pipe 4 perpendicularly onto the respective other lateral bearing face 14a, 14b of the other receiving area 14. However, the first pipe 1 and the second pipe 2 and also the third pipe 3 and the fourth pipe 4 do not make contact with the lateral bearing faces 13a, 13b of the one receiving area 13. The lateral bearing faces 13a, 13b of the one receiving area 13 are thus of no significance for the actual clamping operation but, shortly before the clamping and shortly after the clamping, they keep the seven pipes 1, 2, 3, 4, 5, 6, 7 in an approximately annular arrangement with the central pipe 7. From this arrangement, the increasing clamping force F moves the pipes 1, 2, 3, 4, 5, 6, 7 automatically into the position shown in FIG. 3.

Furthermore, the fifth pipe 5 and the sixth pipe 6 do not make contact with the other bottom bearing face 14c of the other receiving area 14, and the seventh central pipe 7 and the first pipe 1 also do not make contact with one another, and nor do the seventh pipe 7 and the fourth pipe 4. The arrows in FIG. 3 show the flow of the clamping force through the seven pipes 1, 2, 3, 4, 5, 6, 7 in the clamped state.

The further FIGS. 4 to 10 show the arrangement of the seven pipes 1, 2, 3, 4, 5, 6, 7 illustrated in FIG. 3, wherein in each case a diameter of one of the pipes 1, 2, 3, 4, 5, 6, 7 is selected to be smaller than that of the respective other pipes 1, 2, 3, 4, 5, 6, 7, which in each figure have the same diameter as one another.

FIG. 4 shows the pipe arrangement in FIG. 3, but in which the first pipe 1, which is directly adjacent to the air gap 15, has a smaller diameter than the pipes 2 to 7. Here, too, the clamping force profile through the pipes 1, 2, 3, 4, 5, 6, 7 is illustrated by the arrows; it is once again shown that the pipes 2 and 3 which make contact with the movable bottom bearing face 13c do not make contact with one another and as a result do not permit any force transmission between one another. Furthermore, the pipes five 5 and six 6 directly adjacent to the other bottom bearing face 14c of the other receiving area 14 are at a slight distance from the other bottom bearing face 14c. The diagram of FIG. 4 shows that each of the seven pipes 1, 2, 3, 4, 5, 6, 7 is securely clamped.

FIG. 5 shows the arrangement of the seven pipes 1, 2, 3, 4, 5, 6, 7 with a second pipe 2 having a smaller diameter.

In FIG. 4 and FIG. 5, the compensating piece 30 is tilted about the axis of rotation D by a small angle in the anticlockwise direction.

In a corresponding manner, FIG. 6 shows the diagram in the case of a third pipe 3 having a smaller diameter. It can be seen in FIG. 6 that the compensating piece 30 is tilted somewhat about its axis of rotation D in the clockwise direction.

In all cases, the tilting of the compensating piece 30 ensures that a clamping force F is exerted on both the second pipe 2 and the third pipe 3.

FIG. 7 shows an arrangement with a smaller fourth pipe 4. Here, too, the compensating piece 30 is rotated slightly in the clockwise direction about the axis of rotation D; this corresponds to the almost opposite arrangement of FIG. 4, in which the compensating piece 30 is rotated in the anticlockwise direction.

FIGS. 8 and 9 show arrangements with smaller pipe diameters of the fifth pipe 5 and sixth pipe 6, respectively. Here, too, the compensating piece 30 is in each case tilted accordingly, wherein in both cases the pipes 5, 6 make no direct contact with the other bottom bearing face 14c of the other receiving area 14.

In all cases, since the relative angle between the two other lateral bearing faces 14a, 14b of the other receiving area 14 is greater than 60°, it is ensured that the central pipe 7 makes no contact with the two pipes 1 and 4 adjacent to the air gap 15.

FIG. 10 shows the arrangement with a smaller central pipe 7. Here, too, the second pipe 2 and third pipe 3 do not make contact with one another.

FIG. 11 shows a second embodiment of the clamp 10 according to the invention for seven longitudinal profile sections arranged parallel to one another in a bundle, preferably metal pipes 1, 2, 3, 4, 5, 6, 7 of circular cross section. As shown in FIG. 12, the second embodiment differs from the first embodiment in that the movable bearing face 13c has two elastic elements 40, 41. The elastic elements 40, 41 are the ends of flexible tongues which are formed integrally in the form of a wire eroding process from the one clamping jaw 11. The ends of the two flexible tongues 40, 41 point towards one another and are spaced apart from one another by a stationary region 42 of the bottom bearing face 13c. The flexible elements 40, 41 and the stationary region 42 of the bottom bearing face 13c together form the movable bottom bearing face 13c. The side of the flexible tongues 40, 41 that is remote from the receiving area 13 in each case has a travel limiting means in the form of a protrusion 43 pointing away from the receiving area 13. An air gap 15, not visible in the drawing, exists between the protrusion 43 and the wall of the one clamping jaw 11. The two flexible tongues 40, 41 flex independently of one another, unlike the rotatably mounted compensating piece 30. A precise, rotation-free clamping of seven longitudinal profile sections 1, 2, 3, 4, 5, 6, 7 is thus possible. The two flexible elements are ends of elastic tongues that have been integrally eroded out of the one clamping jaw 11.

LIST OF REFERENCE SIGNS 1 pipe
2 pipe
3 pipe
4 pipe
5 pipe
6 pipe
7 pipe
10 clamp
11 clamping jaw
12 clamping jaw
13 receiving area
13a lateral bearing face
13b lateral bearing face
13c movable/tiltable bottom bearing face
14 receiving area
14a lateral bearing face
14b lateral bearing face
14c bottom bearing face
15 air gap
16 groove
20 saw blade
30 compensating piece
40 elastic/flexible element
41 elastic/flexible element
42 stationary region
43 protrusion
D axis of rotation
F clamping force
L longitudinal direction
Q clamping force direction
S clamping direction

The invention claimed is:

1. A pipe processing machine with a clamp for seven longitudinal profiles (1, 2, 3, 4, 5, 6, 7) arranged next to one another and oriented in a longitudinal direction (L), said clamp having one clamping jaw (11) and another clamping jaw (12) which are movable towards one another and away from one another, with a one receiving area (13) in the one clamping jaw (11), the one receiving area has a bearing face (13c) at a bottom for two of the seven longitudinal profiles (2, 3), said bearing face being movable at least in some regions relative to the one clamping jaw (11) transversely to the longitudinal direction (L), and with another receiving area (14) provided in the other clamping jaw (12) for a bearing of four others of the seven longitudinal profiles (1, 4, 5, 6) and the one receiving area (13) and the other receiving area (14) are moveable towards one another and away from one another characterized in that the one receiving area (13) is formed in a prismatic shape as seen in cross section and has between lateral bearing faces (13a, 13b), a bottom bearing face (13c), which is moveable relative to the lateral bearing faces (13a, 13b).

2. The pipe processing machine according to claim 1, characterized in that the one receiving area (13) and the other receiving area (14) are formed as a trough in the respective clamping jaw (11, 12) perpendicular to the longitudinal direction (L) as seen in cross section.

3. The pipe processing machine according to claim 1, characterized in that the one receiving area (13) and the other receiving area (14) are formed in a prismatic shape as seen in cross section.

4. The pipe processing machine according to claim 1, characterized in that the movable bearing face (13c) has at least one element (40, 41) flexing into the one receiving area (13).

5. The pipe processing machine according to claim 4, characterized in that two elastic elements (40, 41) are provided in the one clamping jaw (11), and a region (42) of the bottom bearing face (13c) which is stationary relative to a rest of said clamping jaw (11) is provided between the elastic elements (40, 41).

6. The pipe processing machine according to claim 1, characterized by a compensating piece (30) which includes the bottom bearing face (13c) which is tiltable and mounted to be able to rotate about an axis of rotation (D) arranged in the longitudinal direction (L).

7. The pipe processing machine according to claim 1, characterized in that the other receiving area (14) has two other lateral bearing faces (14a, 14b) running towards one another at an angle greater than 60°.

8. The pipe processing machine according to claim 1, characterized in that seven longitudinal profiles (1, 2, 3, 4, 5, 6, 7) are arranged in the clamp (10) and one central longitudinal profile (7) is surrounded by six longitudinal profiles (1, 2, 3, 4, 5, 6) in an annular arrangement, and two longitudinal profiles (2, 3) which bear against the bottom bearing face (13c) which is tiltable and does not make contact with one another even in a clamped state of the clamp (10).

9. The pipe processing machine according to claim 8, characterized in that the central longitudinal profile (7), in the clamped state, makes contact with the two longitudinal profiles (2, 3) which bear against the movable bottom bearing face (13c), and makes contact with the two longitudinal profiles (5, 6) adjacent to an other bottom bearing face (14c) and does not make contact with the two longitudinal profiles (1, 4) running along an air gap (15) between the clamped clamping jaws (11, 12).

10. The pipe processing machine according to claim 1, characterized in that the one receiving area (13) includes a compensating piece (30) and the one receiving area (13) has the lateral bearing faces (13a, 13b) which in the clamped state are not in contact with any of the longitudinal profiles (1, 2, 3, 4, 5, 6, 7).

\* \* \* \* \*